June 19, 1945.  W. KIERSTED, JR  2,378,734
CATALYTIC CONVERSION OF HYDROCARBONS
Filed Sept. 10, 1943
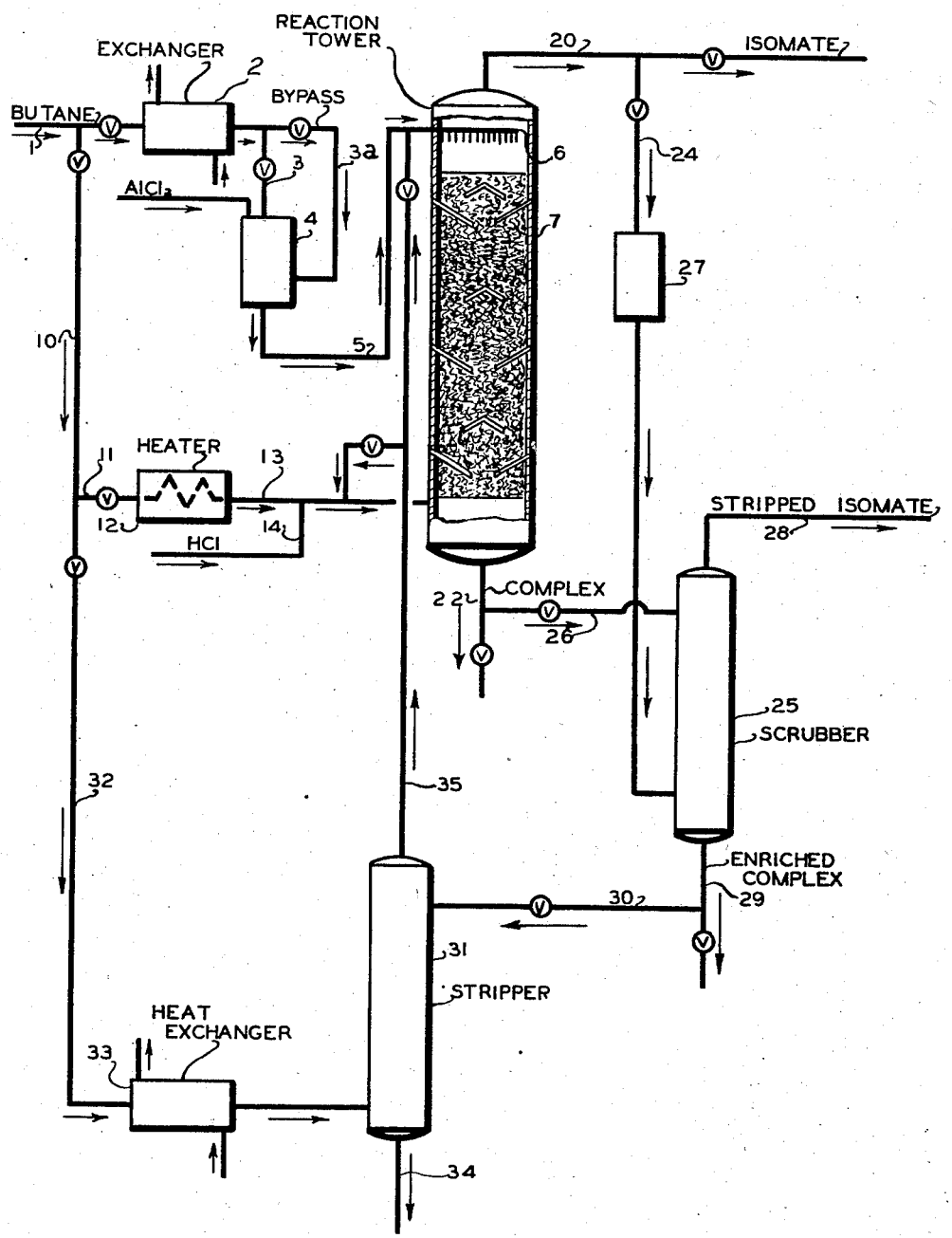
WYNKOOP KIERSTED Jr.
INVENTOR
BY
HIS ATTORNEY Patented June 19, 1945

2,378,734

UNITED STATES PATENT OFFICE 2,378,734

CATALYTIC CONVERSION OF HYDROCARBONS

Wynkoop Kiersted, Jr., New York, N. Y., assignor to The Texas Company, New York, N. Y., a corporation of Delaware Application September 10, 1943, Serial No. 501,795

7 Claims. (Cl. 260—683.5)

This invention relates to a continuous process for effecting catalytic conversions such as the isomerization of hydrocarbons.

The invention contemplates effecting catalytic conversion of hydrocarbons with a metallic halide catalyst such as aluminum chloride under conditions such that metallic halide-hydrocarbon complex is formed usually in relatively small amount. The invention involves carrying out the conversion in a packed tower wherein a stream of feed hydrocarbons advantageously in vapor phase is caused to rise through the tower countercurrently to and in direct contact with a liquid comprising aluminum chloride dissolved in hydrocarbons and some complex. The reaction tower is maintained under conditions suitable for effecting the desired reaction.

A stream of hydrocarbons containing hydrocarbon products of reaction is continuously discharged from the upper portion of the reaction tower while a stream comprising complex liquid is discharged from the bottom or lower portion of the tower.

A feature of the invention involves effecting countercurrent contact between a stream of feed hydrocarbons and the catalyst, including complex compounds that may be formed in situ by reaction between the catalyst and the hydrocarbons undergoing treatment, so that the catalyst may be used more effectively. Aluminum chloride, for example, is relatively more soluble in the complex compounds than in the hydrocarbons undergoing treatment, and therefore this complex material containing dissolved aluminum chloride is effective as a catalyst.

Accordingly, the present invention involves effecting intimate contact between the complex material and relatively fresh feed hydrocarbons so as to utilize the catalytic action of aluminum chloride contained in a complex material which is formed as an incident in the carrying out of the principal conversion reaction.

The invention has particular application to the isomerization of a saturated hydrocarbon such as normal butane. In accordance with the invention a stream of normal butane in vapor phase and heated to an elevated temperature is continuously introduced to the lower portion of a packed reaction tower. Another stream of normal butane in liquid phase and containing the metallic halide catalyst dissolved therein is continuously introduced to the upper portion of the tower. The stream of vaporized butane rises through the packing within the tower countercurrently to the downwardly flowing stream of liquid containing dissolved metallic halide catalyst. The reaction tower is maintained at a temperature of about 200 to 220° F. or at a temperature within the range 160 to 240° F. Contact between the flowing catalyst and hydrocarbons is effected in the presence of a suitable promoter such as hydrogen chloride so that isomerization of normal butane to isobutane occurs as the principal reaction.

A small amount of the feed hydrocarbons enters into reaction with the metallic halide, forming liquid complex compounds which descend through the packing material countercurrently to the rising butane vapor.

A stream of isobutane and unreacted normal butane is continuously drawn off from the top of the tower while complex liquid and any heavier hydrocarbons that may be formed in the reaction are continuously discharged from the bottom of the tower.

Temperature conditions and promoter concentration may be adjusted so that substantially no cracking occurs and consequently the effluent hydrocarbon stream discharged from the top of the tower is substantially free from or contains a very small amount of hydrocarbons of lower molecular weight than normal butane.

The effluent hydrocarbon stream is subsequently subjected to fractionation if desired for the purpose of effecting separation between normal butane and isobutane so that the normal butane may be recycled to the reaction.

The effluent hydrocarbon stream will contain a substantial amount of hydrogen chloride promoter and provision can be made for recovering the promoter and recycling it to the reaction. Likewise under certain conditions of operation the effluent hydrocarbons may contain a small amount of metallic halide and provision may be made for effecting removal of metallic halide from the hydrocarbons prior to the fractionating step. Such removal may be effected by chemical treatment or by passing the effluent hydrocarbon stream through a separate vessel packed with a solid adsorptive material capable of effecting removal of metallic halide by adsorption.

According to a modification of the present invention the effluent hydrocarbon stream of isomate containing metallic halide may be subjected to contact with metallic halide-hydrocarbon complex liquid which has a relatively low concentration of metallic halide, as, for example, the complex liquid discharged from the reaction tower. This complex is thus used to scrub metallic halide and promoter from the isomate stream.

As a result of such scrubbing the complex becomes enriched in metallic halide and promoter. Consequently, it may be desirable to recover from the enriched complex the metallic halide and promoter which has been scrubbed from the isomate stream. This can be accomplished by passing the enriched complex liquid material to a stripping zone wherein it is subjected to contact with a stream of feed hydrocarbons under conditions of temperature and pressure adapted to effect removal of the metallic halide and promoter at least to a substantial extent from the complex liquid. The resulting feed hydrocarbon stream containing metallic halide and promoter stripped from the complex is passed advantageously to the reaction tower as will be described in more detail upon reference to the drawing.

In order to describe the invention more fully reference will now be made to the accompanying drawing comprising a diagram of flow illustrating one mode of practicing the invention.

As indicated in the drawing a stream of normal butane is drawn from a source not shown through a pipe 1 leading to an exchanger 2 wherein the temperature is brought to the desired level. From the exchanger 2 the butane stream passes through a pipe 3 to a vessel 4 containing solid aluminum chloride. During passage through the vessel a small amount of aluminum chloride is dissolved in the liquid butane stream. The amount dissolved depends upon the temperature maintained which may be in the range 140 to 180° F. and also upon the amount of butane passing through the vessel 4. Usually the volume of butane passing through the vessel 4 does not exceed about ⅓ of the total volume of butane charged to the system and generally amounts to about ⅙ of the total. A bypass 3a may be provided through which a portion of the butane entering the top of the tower may be introduced to the bottom or lower portion of the vessel 4. The amount so bypassed may amount to about ⅙ of the total butane feed to the system.

The butane containing dissolved aluminum chloride is conducted from the vessel 4 through a pipe 5 terminating in a suitable distributor 6 positioned within the upper portion of a reaction tower 7.

The reaction tower comprises an elongated vertical vessel packed with inert contact material such as Raschig rings, quartz, etc. The packing may extend to a depth ranging from about 10 to 70 feet or more. Advantageously the interior of the tower may be provided with baffles, as indicated, to prevent the complex from running all the way down the interior wall of the tower.

Another portion of butane feed is diverted from the pipe 1 through a pipe 10 and a branch pipe 11 leading to a heater 12 wherein the butane is heated to a temperature in the range 200 to 250° F. The heating temperature will depend upon the amount of heat required to maintain the reaction tower at the predetermined reaction temperature level. Advantageously the heated butane enters the bottom of the reaction tower in vapor phase and superheated to a sufficiently high temperature to supply the heat of reaction, and in addition, the heat necessary for vaporizing the butane entering the upper portion of the reaction tower through the pipe 5.

The heated vaporized butane thus passes from the heater 12 through a pipe 13 to the lower portion of the reaction tower 7, advantageously at a point just below the packing.

Hydrogen chloride is introduced from a source not shown through a pipe 14 which may communicate with the previously mentioned pipe 13.

Thus the butane vapors rise through the packing material in the reaction tower 7 and in doing so flow countercurrently to liquid hydrocarbons and catalyst descending from the upper portion of the tower.

The isomerization of normal butane to isobutane thus occurs during passage of the hydrocarbons and catalyst through the packing material.

The treated hydrocarbons comprising isobutane are continuously drawn off from the top of the tower 7 through a pipe 20 which may lead to other apparatus wherein the isomate is subjected to treatment so as to effect recovery of entrained promoter and any entrained catalyst as well as to effect such fractionation as may be desired.

The liquid accumulating in the bottom of the reaction tower 7 consists essentially of aluminum chloride-hydrocarbon complex and may have associated with it a small amount of hydrocarbons including tarry material.

In descending toward the bottom of the reaction tower the complex has been brought into intimate contact with fresh butane feed entering from the pipe 13. The rising butane stream tends to denude the complex of free aluminum chloride, the aluminum chloride so removed being used to effect isomerization within the reaction tower, some of it entering into complex formation so that it is ultimately consumed.

Consequently, the complex liquid as drawn off from the bottom of the reaction tower 7 through the pipe 22 has a relatively low concentration of aluminum chloride. This complex can be discharged from the system and disposed of in any suitable manner including decomposition.

On the other hand this denuded complex material may be used as a scrubbing medium to scrub the isomate stream being discharged through the pipe 20 so as to effect removal from the isomate of the small amount of aluminum chloride that may be contained therein as well as to effect removal of hydrogen chloride at least in part.

Therefore, as indicated in the drawing all or a portion of the isomate may be diverted through a pipe 24 leading to the lower portion of a scrubber 25 which may comprise a packed tower somewhat similar to the reaction tower 7. The previously mentioned denuded complex drawn off from the pipe 22 may be diverted all or in part through a pipe 26 leading to the upper portion of the scrubber 25.

Advantageously the isomate stream entering the scrubber 25 is first cooled during passage through a cooler 27 to a temperature ranging from about 70 to 130° F. The extent of cooling will depend upon the temperature conditions desired to maintain in the scrubber 25 so as to accomplish effective stripping of entrained aluminum chloride and promoter from the isomate.

The stripped isomate is continuously discharged from the top of the scrubber 25 through a pipe 28 which may lead to suitable fractionating equipment or to other apparatus depending upon the nature of the treatment desired.

The enriched complex is drawn off from the bottom of the scrubber 25 through a pipe 29 and may be discharged from the system, or on the other hand conducted all or in part through a pipe 30 to a stripper 31.

The stripper 31 may be similar to the scrubber 25 and is utilized to effect recovery of aluminum chloride and promoter from the enriched complex. The stripping agent advantageously comprises a portion of the butane feed which may be conducted from the previously mentioned pipe 10 through a pipe 32 and heat exchanger 33 to the lower portion of the stripper 31.

The butane advantageously in liquid phase rises through the stripper countercurrently to the enriched complex and thus effects removal of aluminum chloride and promoter. Temperature conditions are maintained within the stripper 31 suitable to effect solution of the aluminum chloride and promoter in the stream of butane. These temperatures may range from about 130 to 160° F.

The denuded complex is discharged from the bottom of the stripper 31 through a pipe 34.

The butane stream containing aluminum chloride and promoter is conducted from the top of the stripper 31 through a pipe 35 which advantageously communicates with the previously mentioned pipe 5 leading to the top of the reaction tower 7. Provision may be made, however, for injecting this stream into the pipe 13 as indicated. If desired, this stream may be injected into the reaction tower 7 at intermediate points thereof.

The scrubber 25 and the stripper 31 may be operated so that a substantial body of complex liquid is maintained therein through which the hydrocarbons are caused to rise by difference in specific gravity and in which case these vessels may contain no packing material.

While reference has been made to maintaining at least the major portion of the hydrocarbon in the reaction tower 7 in the vapor phase it is contemplated that the conversion reaction may be carried out with the feed hydrocarbons entirely in the liquid phase. For example, the aluminum chloride catalyst may be added as a solution in a liquid of greater specific gravity than the feed hydrocarbon undergoing conversion, the hydrocarbons thus rising through the catalyst solution by difference in density.

Other metallic halides including aluminum bromide may be employed. Likewise the promoter may comprise other hydrogen halides besides hydrogen chloride.

While normal butane has been specifically referred to in connection with the method of flow illustrated in the drawing, nevertheless, it is contemplated that the process is applicable to the treatment of other hydrocarbons and particularly saturated gasoline hydrocarbons which are substantially free from unsaturated constituents.

If desired, the isomerization reaction may be carried out in the presence of hydrogen or other agents adapted to modify the reaction. Such other agents may include low boiling naphthene and aromatic hydrocarbons which are added to the reaction in small and controlled amount for the purpose of inhibiting cracking or other side reactions so that isomerization constitutes the principal reaction. The reaction is carried out at temperatures ranging from about 150 to not in excess of about 300 to 350° F., depending upon the character of the feed hydrocarbon and the extent of conversion desired.

Obviously many modifications and variations of the invention, as hereinbefore set forth, may be made without departing from the spirit and scope thereof, and therefore only such limitations should be imposed as are indicated in the appended claims.

I claim:

1. In a continuous process for isomerizing hydrocarbons by the action of a metallic halide isomerization catalyst in the presence of hydrogen halide under conditions such that some metallic halide-hydrocarbon complex is formed, the steps comprising introducing a stream of feed hydrocarbon at a predetermined temperature to the lower portion of a reaction tower, introducing a stream of liquid containing metallic halide dissolved therein to the upper portion of said tower, passing said streams countercurrently through the tower while in intimate contact with each other in the presence of hydrogen halide, maintaining said streams during said contact at a temperature such that isomerization of hydrocarbons constitutes the principal reaction, discharging a hydrocarbon stream comprising isomerized hydrocarbons and some metallic halide from the upper portion of said tower, discharging liquid complex relatively lean in metallic halide from the lower portion of said tower, separately subjecting said stream of isomerized hydrocarbons to contact with discharged complex liquid under conditions such that the complex effects removal of metallic halide contained in the isomerized hydrocarbon stream to produce enriched complex and discharging the isomerized hydrocarbon stream from further contact with the complex liquid.

2. In a continuous process for isomerizing hydrocarbons by the action of a metallic halide isomerization catalyst in the presence of hydrogen halide under conditions such that some metallic halide-hydrocarbon complex is formed, the steps comprising introducing a stream of feed hydrocarbon at a predetermined temperature to the lower portion of a reaction tower, introducing a stream of liquid containing metallic halide dissolved therein to the upper portion of said tower, passing said streams countercurrently through the tower while in intimate contact with each other in the presence of hydrogen halide, maintaining said streams during said contact at a temperature such that isomerization of hydrocarbons constitutes the principal reaction, discharging a hydrocarbon stream comprising isomerized hydrocarbons and some metallic halide from the upper portion of said tower, discharging liquid complex relatively lean in metallic halide from the lower portion of said tower, separately subjecting said stream of isomerized hydrocarbons to contact with discharged complex liquid under conditions such that the complex effects removal of metallic halide contained in the isomerized hydrocarbon stream to produce enriched complex, discharging the isomerized hydrocarbon stream from further contact with the complex liquid, subjecting the enriched complex liquid to contact with a portion of the feed hydrocarbon under conditions such that the feed hydrocarbon strips metallic halide from the complex, and passing the feed hydrocarbons containing metallic halide stripped from the complex to the reaction tower.

3. In a continuous process for isomerizing hydrocarbons by the action of a metallic halide isomerization catalyst in the presence of hydrogen halide in a reaction tower packed with solid inert contact material and under conditions such that some metallic halide-hydrocarbon complex is formed in situ by reaction between feed hydrocarbons and metallic halide, the steps comprising forming a stream comprising the major proportion of the hydrocarbon feed and a stream in liquid phase comprising the minor proportion of the hydrocarbon feed, dissolving metallic halide in the liquid stream of minor proportion, introducing the stream containing dissolved metallic halide to the tower above the mass of contact material, introducing the stream of major proportion to the lower portion of the tower, heating said last-mentioned stream, prior to introduction, to a predetermined temperature sufficient to maintain the reaction tower under isomerizing conditions of temperature, causing the heated stream to rise through the contact mass in the presence of hydrogen halide countercurrently to catalyst descending in liquid phase, said catalyst comprising metallic halide and metallic halide-hydrocarbon complex formed in situ, effecting substantial isomerization of feed hydrocarbons during flow through the contact mass, discharging isomerized hydrocarbons and some metallic halide from the upper portion of said tower, discharging from the bottom portion of the tower liquid complex having a relatively low concentration of metallic halide, separately subjecting said discharged isomerized hydrocarbons to contact with said discharged liquid complex under conditions such that the complex effects removal of metallic halide contained in the isomerized hydrocarbons to produce enriched complex, and then discharging the isomerized hydrocarbons from further contact with the complex liquid.

4. The process according to claim 3 in which the heated stream of feed hydrocarbon is introduced to the reaction tower in vapor phase.

5. The process according to claim 3 in which the isomerization catalyst is aluminum halide.

6. In a continuous process for isomerizing normal butane by the action of an aluminum halide isomerization catalyst in the presence of hydrogen halide in a reaction tower packed with solid inert contact material and under conditions such that some aluminum halide-hydrocarbon complex is formed in situ by reaction between normal butane and aluminum halide, the steps comprising forming a stream comprising the major proportion of the normal butane feed and a stream in liquid phase comprising the minor proportion of the normal butane feed, dissolving aluminum halide in the liquid stream of minor proportion, introducing the stream containing dissolved aluminum halide to the tower above the mass of contact material, introducing the stream of major proportion to the lower portion of the tower, heating said last-mentioned stream, prior to introduction, to a predetermined temperature sufficient to maintain the reaction tower under isomerizing conditions of temperature, causing the heated stream to rise through the contact mass in the presence of hydrogen halide countercurrently to catalyst descending in liquid phase, said catalyst comprising aluminum halide and aluminum halide-hydrocarbon complex formed in situ, effecting substantial isomerization of normal butane during flow through the contact mass, discharging isomerized normal butane and some aluminum halide from the upper portion of said tower, discharging from the bottom portion of the tower liquid complex having a relatively low concentration of aluminum halide, separately subjecting said discharged isomerized normal butane to contact with said discharged liquid complex under conditions such that the complex effects removal of aluminum halide contained in the isomerized butane to produce enriched complex, and then discharging the isomerized butane from further contact with the complex liquid.

7. The process according to claim 6 in which the reaction is effected at a temperature in the range 160–240° F.

WYNKOOP KIERSTED, Jr.